US007159896B2

(12) United States Patent
Ochiai et al.

(10) Patent No.: US 7,159,896 B2
(45) Date of Patent: Jan. 9, 2007

(54) OCCUPANT RESTRAINT SYSTEM

(75) Inventors: Fumiharu Ochiai, Wako (JP); Naoki Kawajiri, Wako (JP); Takeru Fukuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 308 days.

(21) Appl. No.: 10/802,480

(22) Filed: Mar. 16, 2004

(65) Prior Publication Data
US 2004/0201207 A1    Oct. 14, 2004

(30) Foreign Application Priority Data
Apr. 14, 2003 (JP) .............................. 2003-108953

(51) Int. Cl.
B60R 21/16 (2006.01)
B60R 21/20 (2006.01)
B60R 21/213 (2006.01)
B60R 21/215 (2006.01)

(52) U.S. Cl. ................................... 280/730.2
(58) Field of Classification Search .............. 280/730.2
See application file for complete search history.

(56) References Cited

U.S. PATENT DOCUMENTS

| | | | | |
|---|---|---|---|---|
| 5,791,683 A * | 8/1998 | Shibata et al. | ........... | 280/730.2 |
| 5,884,937 A * | 3/1999 | Yamada | ................ | 280/730.2 |
| 6,079,732 A * | 6/2000 | Nakajima et al. | ........ | 280/728.2 |
| 6,082,761 A * | 7/2000 | Kato et al. | ............... | 280/730.2 |
| 6,129,377 A * | 10/2000 | Okumura et al. | ........ | 280/730.2 |
| 6,173,990 B1 * | 1/2001 | Nakajima et al. | ........ | 280/730.2 |
| 6,220,623 B1 * | 4/2001 | Yokota | .................... | 280/728.2 |
| 6,234,517 B1 * | 5/2001 | Miyahara et al. | ........ | 280/730.2 |
| 6,254,123 B1 * | 7/2001 | Urushi et al. | ............ | 280/730.2 |
| 6,293,581 B1 * | 9/2001 | Saita et al. | .............. | 280/730.2 |
| 6,305,707 B1 * | 10/2001 | Ishiyama et al. | ........ | 280/728.2 |
| 6,334,626 B1 * | 1/2002 | Nakajima et al. | ........ | 280/730.2 |
| 6,530,594 B1 * | 3/2003 | Nakajima et al. | ........ | 280/730.2 |
| 6,869,099 B1 * | 3/2005 | Kawasaki et al. | ....... | 280/730.2 |
| 6,962,364 B1 * | 11/2005 | Ju et al. | ................... | 280/730.2 |
| 6,974,151 B1 * | 12/2005 | Ochiai et al. | ............ | 280/728.2 |
| 7,011,337 B1 * | 3/2006 | Aoki et al. | .............. | 280/730.2 |

FOREIGN PATENT DOCUMENTS

| | | |
|---|---|---|
| JP | 3113977 | 9/2000 |
| JP | 2002-019565 | 1/2002 |
| JP | 2003-002152 | 1/2003 |

* cited by examiner

*Primary Examiner*—Paul N. Dickson
*Assistant Examiner*—Joselynn Y. Sliteris
(74) *Attorney, Agent, or Firm*—Hamre, Schumann, Mueller & Larson, P.C.

(57) ABSTRACT

A belt-like protruding portion 34d extending longitudinally is provided on an air bag cover 34 which covers a folded air bag 21. In the event that the air bag 21 is twisted when the air bag 21 is mounted on a vehicle body, a longitudinal dimension of the air bag 21 is contracted largely, whereby an interval between adjacent mounting portions 21a is decreased, thereby the fixing of the air bag 21 being disabled. As a result, the fixing of the air bag 21 in the twisted state is prevented assuredly, and the smooth deployment of the air bag 21 is enabled. A rod-like twist preventing member may be fixed longitudinally along the folded air bag 21 instead of the belt-like protruding portion 34d.

5 Claims, 18 Drawing Sheets

OCCUPANT RESTRAINT SYSTEM

BACKGROUND OF THE INVENTION

The present invention relates to an occupant restraint system for deploying a folded air bag in a curtain-like fashion from a side portion of a roof along an inner side of a passenger compartment of a vehicle.

Since the air bag of the occupant restraint system is formed into an elongated string-like shape when folded, there exists a possibility that the air bag so folded is twisted when mounted on a vehicle body, and in the event that the air bag is mounted on the vehicle body in a twisted state, a smooth deployment is disrupted. To solve that problem, a mark was imparted on the surface of a folded air bag so that the folded air bag is mounted on the vehicle body in an untwisted state by visually watching the mark, which is known by the following patent literature.

Japanese Examined Patent Publication No. 3113977

However, since the conventional occupant restraint system was such as to prevent the twisting of the folded air bag by an assembler who visually watched the mark imparted on the surface of the folded air bag, there has existed a possibility that the folded air bag was mounted in a twisted state from an error of the assembler in watching the mark.

SUMMARY OF THE INVENTION

The invention is made in view of the situation, and an object thereof is to prevent assuredly the fixing of the folded air bag in a twisted state.

With a view to attaining the object, according to a first aspect of the invention, there is provided an occupant restraint system in which mounting portions provided longitudinally at a plurality of locations of a folded air bag are fixed along a side portion of a roof, so that the air bag is inflated to be deployed in a curtain-like fashion along an inner side of a passenger compartment by gas generated from an inflator at the time of a collision of a vehicle, wherein the fixing of the folded air bag in a twisted state is prevented by providing a belt-like protruding portion which extends longitudinally along the air bag on an external portion of the air bag.

According to the construction, since the belt-like protruding portions which extend longitudinally along the folded air bag are provided on the external portion of the air bag, the longitudinal dimension of the air bag is largely contracted when the air bag is twisted and hence, an interval between the adjacent mounting portions is decreased, thereby making it impossible for the air bag to be fixed. As a result, the air bag is assuredly prevented from being mounted in the twisted state, whereby the air bag is allowed to be deployed smoothly.

According to a second aspect of the invention, there is provided an occupant restraint system in which a folded air bag is fixed along a side portion of a roof, so that the air bag is inflated to be deployed in a curtain-like fashion along an inner side of a passenger compartment by gas generated from an inflator at the time of a collision of a vehicle, wherein a rod-like twist preventing member is fixed longitudinally along the folded air bag so that the twisting of the air bag is prevented by the twist preventing member so fixed.

According to the construction, since the rod-like twist preventing member is fixed longitudinally along the folded air bag, the air bag is disabled from being twisted. As a result, the air bag is assuredly prevented from being fixed in the twisted state, whereby the air bag is allowed to be deployed smoothly.

DETAILED DESCRIPTION OF THE PREFERRED EMBODIMENTS

Modes for carrying out the invention will be described below based on embodiments illustrated in the accompanying drawings.

Figure 1:
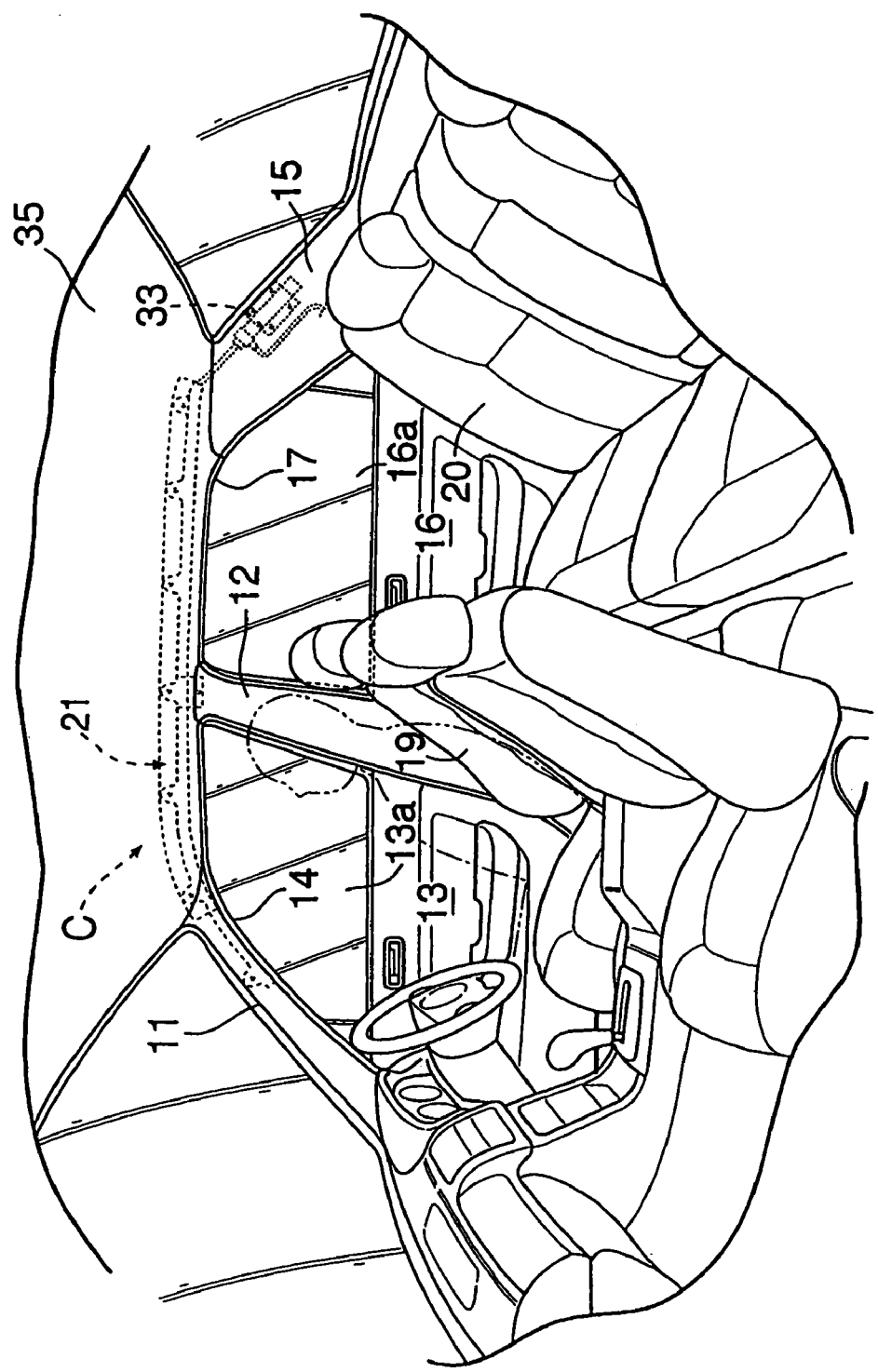
FIG. 1 is a drawing showing the inside of a passenger compartment of a vehicle when an air bag is not deployed.
Figure 2:
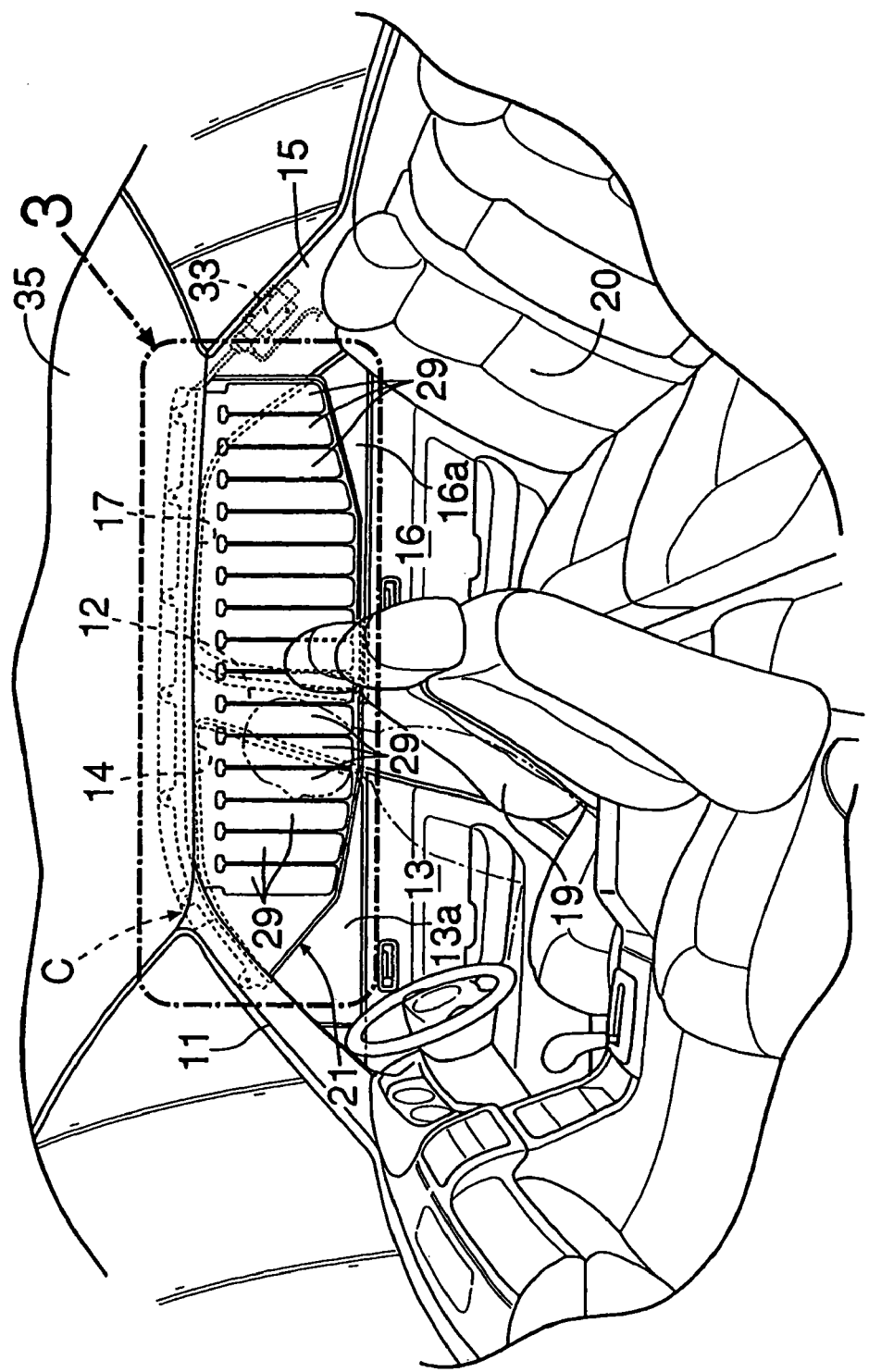
FIG. 2 is a drawing showing the inside of the passenger compartment of the vehicle when the air bag is deployed.
Figure 3:
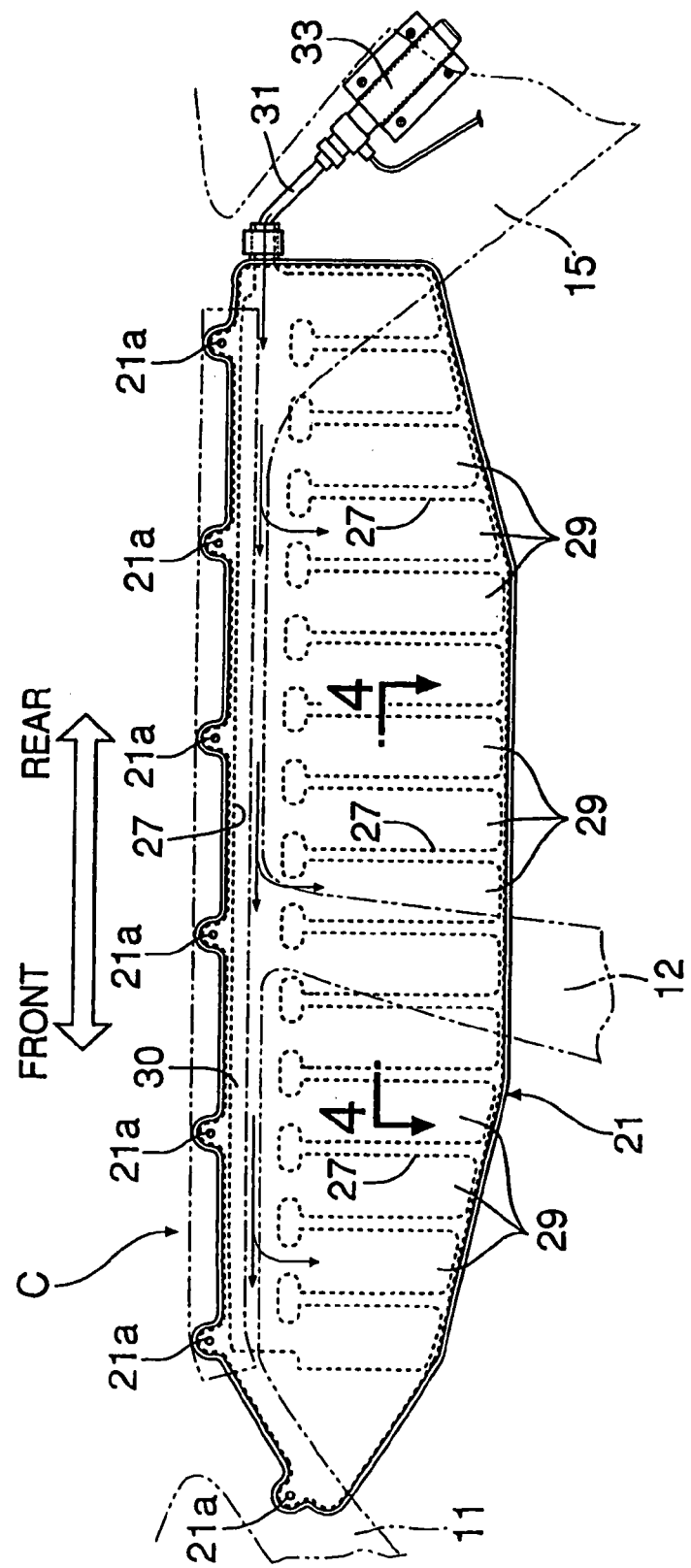
FIG. 3 is an enlarged view of a portion indicated by a larger reference numeral 3 in FIG. 2.
Figure 4:
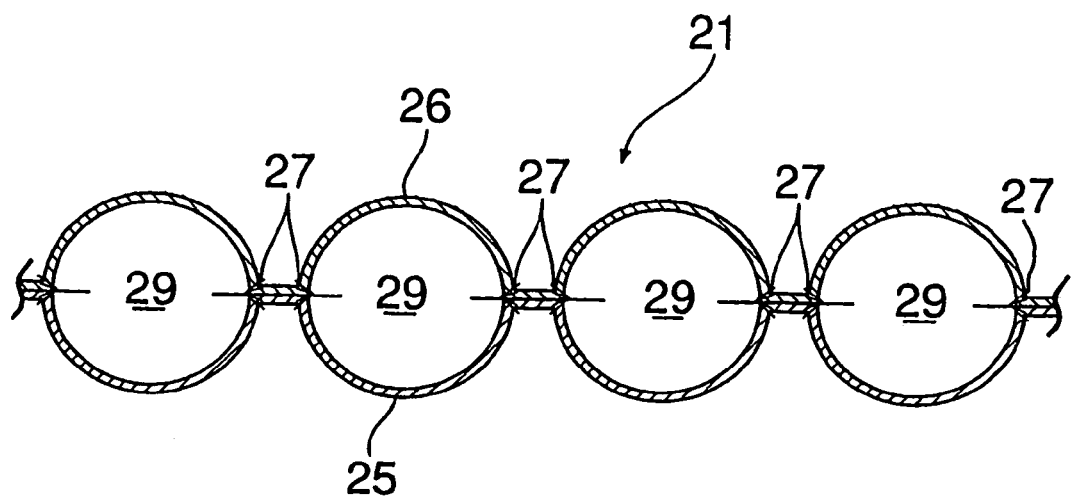
FIG. 4 is a cross-sectional view taken along the line 4—4 in FIG. 3.
Figure 5:
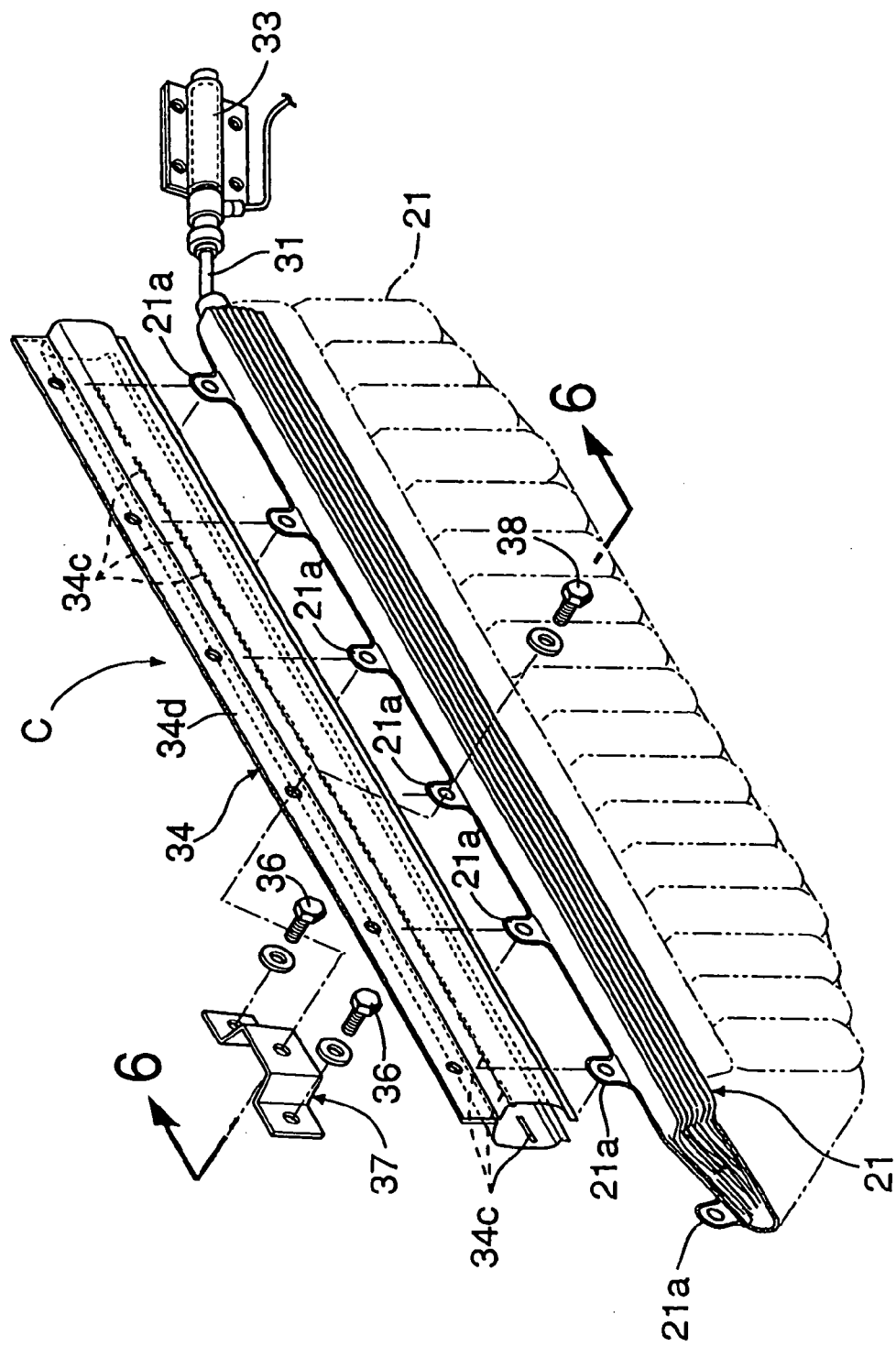
FIG. 5 is an exploded perspective view of an occupant restraint system.
Figure 6:
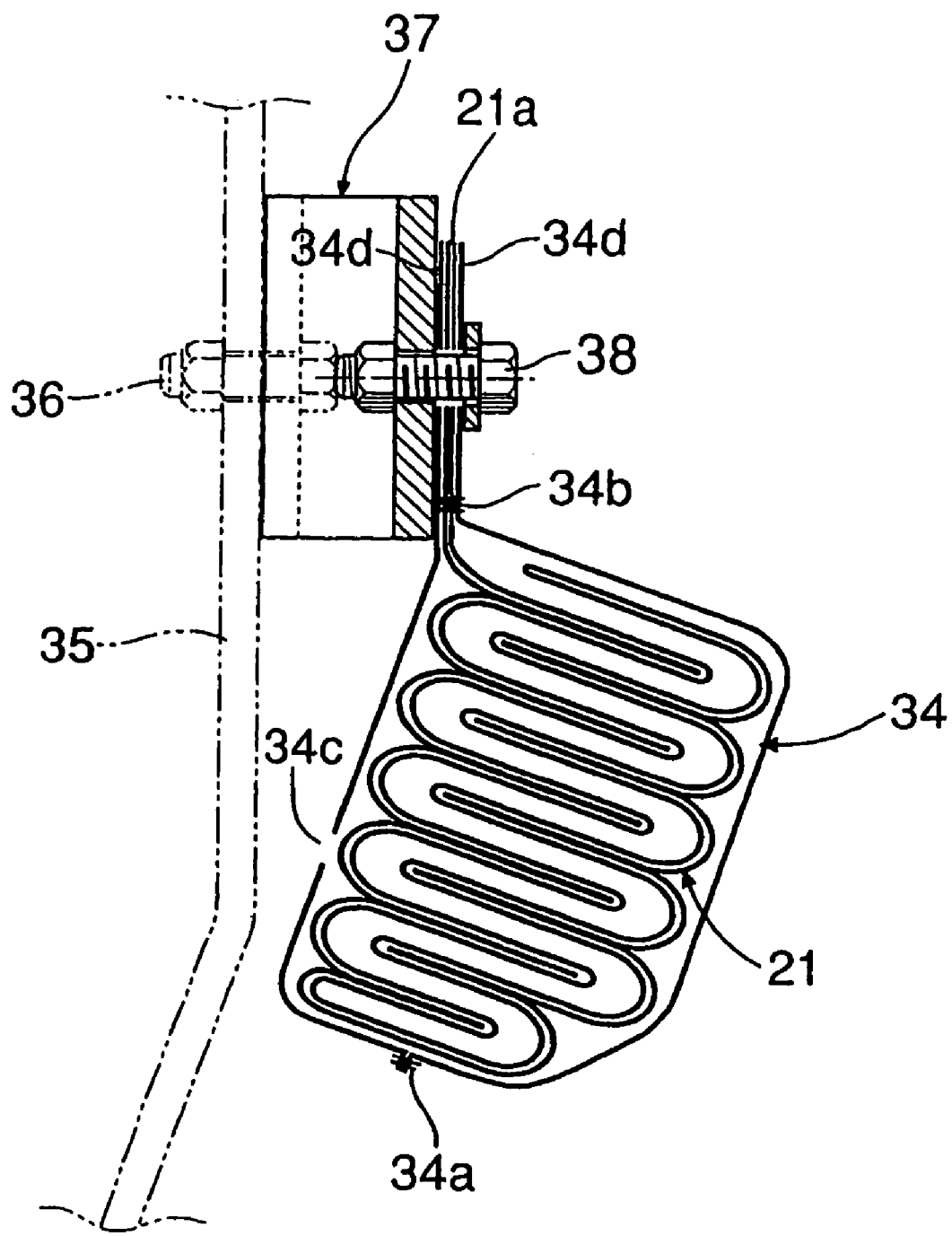
FIG. 6 is an enlarged cross-sectional view taken along the line 6—6 in FIG. 5.
Figure 7:
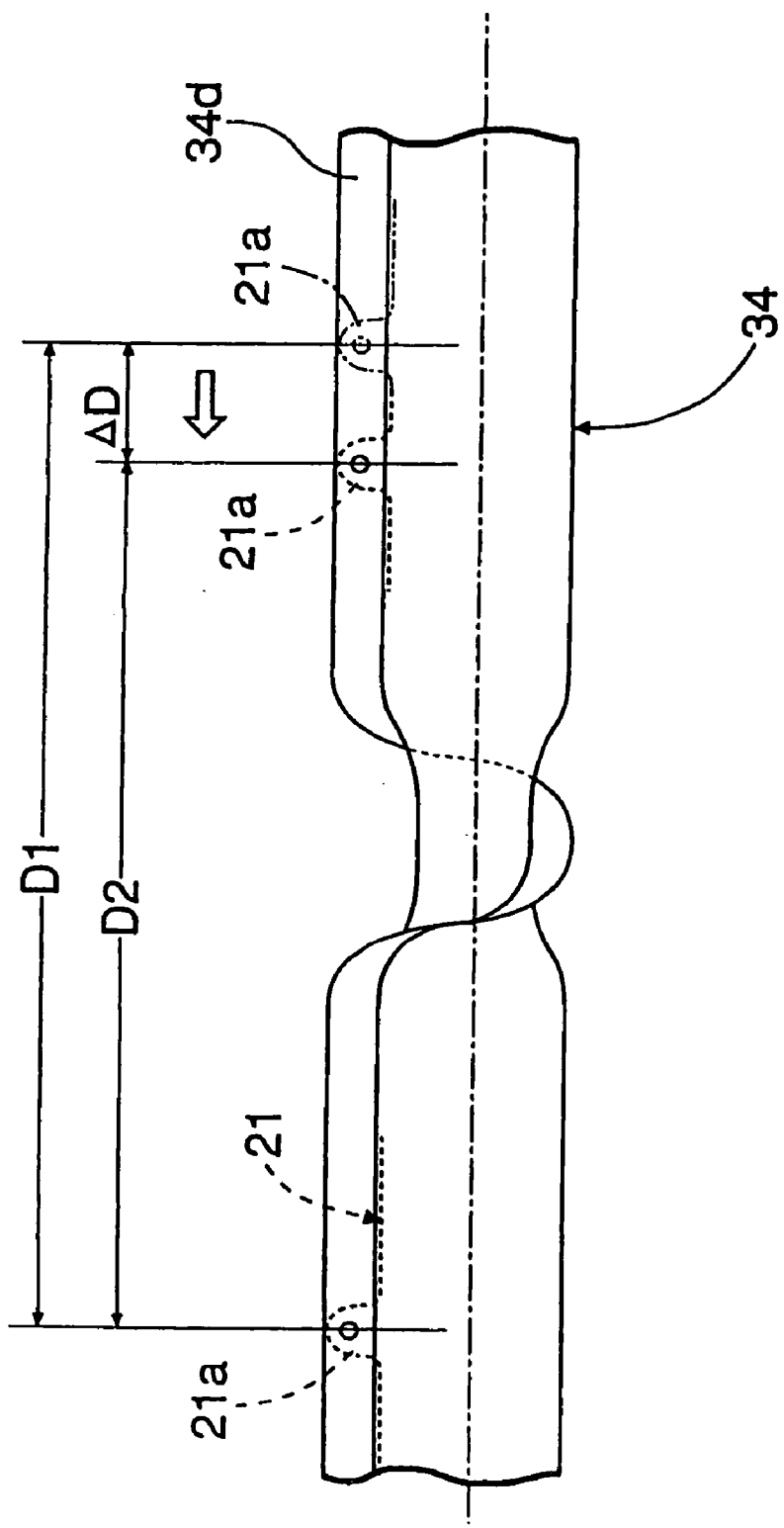
FIG. 7 is an explanatory view explaining the operation of the air bag when twisted.

FIGS. 1 to 7 illustrate a first embodiment, in which FIG. 1 is a drawing showing the inside of a passenger compartment of an automobile when an air bag is not yet deployed, FIG. 2 is a drawing showing the inside of the passenger compartment of the automobile when the air bag is deployed, FIG. 3 is an enlarged view of a portion in FIG. 2 which is indicated by larger reference numeral 3, FIG. 4 is a cross-sectional view taken along the line 4—4 in FIG. 3, FIG. 5 is an exploded perspective view of an occupant restraint system, FIG. 6 is a cross-sectional view taken along the line 6—6 in FIG. 5, and FIG. 7 is a drawing explaining an operation of the air bag when twisted.

As shown in FIG. 1, in a side of a vehicle body of a vehicle, a door opening 14 is formed between front pillar 11 and a center pillar 12 for mounting therein a front side door 13 and a door opening 17 is mounted between the center pillar 12 and a rear pillar 15 for mounting therein a rear side door 16. A roof side rail (not shown) which extends in a longitudinal direction of the vehicle body in such a manner as to connect an upper end of the front pillar 11 and an upper end of the rear pillar 15 defines upper edges of the door openings 14, 17 for the front side door 13 and the rear side door 16, and an occupant restraint system C is provided along the roof side rail. Note that while occupant restraint systems C which are constructed substantially identically are provided on left and right sides of a vehicle body. The occupant restraint system provided on the right side of the vehicle body will be described as representing both the systems.

As shown in FIG. 2, in the event that an acceleration equal to or greater than a predetermined value is detected when the vehicle is subjected to a side impact of a rollover, an air bag 21 of the occupant restraint system C deploys downwardly from the upper edges of the openings 14, 17 as a curtain is lowered so as to provide a screen between an inner side of the vehicle body, that is, inner sides of the front pillar 11, the center pillar 12, the rear pillar 15, a front side window glass 13a in the front side door 13 and a rear side window glass 16a in the rear side door 16, and occupants seated in a front seat 19 and a rear seat 20.

As shown in FIGS. 3 and 4, the air bag 21 extending in a longitudinal direction of the vehicle body is formed by superimposing a first base fabric 25 on a second base fabric 26 twofold and sewing 27 them together, and a plurality of cells 29 and an upper communicating passage 30, are formed in the air bag 21 by such sewing 27. The first base fabric 25 and the second base fabric 26 are formed into a substantially identical shape. The plurality of cells 29 branch off downwardly from the upper communicating passage 30 which connects to a highly pressurized gas supply pipe 31 which extends from an inflator 33 accommodated in the interior of the rear pillar 15, and lower ends of the respective cells 29 are closed. A plurality of mounting portions 21a are formed along the upper communicating passage 30 of the air bag 21.

As shown in FIGS. 5 and 6, an air bag cover 34 is made up of two rectangular nonwoven fabrics which are sewn together at a lower sewing portion 34a and an upper sewing portion 34b in such a manner as to form a tubular shape so that the air bag 21 which is folded up is accommodated in the interior of the air bag cover 34 so formed, and slits 34c are formed like a sew line in an outboard side of the air bag cover 34 in such a manner as to be broken when the air bag 21 is inflated. A belt-like protruding portion 34d extends longitudinally along an upper portion of the upper sewing portion 34b, and the plurality of mounting portions 21a on the air bag 21 are held in the belt-like protruding portion 34d of the air bag cover 34 and are then sewn together with the belt-like protruding portion 34d at the upper sewing portion 34b. Then, the mounting portions 21a and the belt-like protruding portion 34d of the air bag cover 34 are fastened together with common bolts 38 to a plurality of brackets 37 which are fixed to the roof 35 with bolts 36.

Next, the operation of the first embodiment will be described.

When an acceleration sensor detects an acceleration equal to or greater than a predetermined value as a result of a side collision of the vehicle, the inflator 33 is activated by a command from an air bag deployment control means, and a highly pressurized gas which is compressed so as to be filled in the inflator 33 flows into the upper communicating passage 30 and the respective cells 29 of the folded air bag 21 via the highly pressurized gas supply pipe 31, whereby the cells 29 are inflated. The slits 34c in the air bag cover 34 are broken by the inflation of the air bag 21, and the air bag 21 which is released from a restrained state deploys downwardly. Since an side edge of a roof garnish is forced downwardly by virtue of a pressure applied by the air bag 21 which is being deployed so as to form an opening, the air bag 21 then passes through the opening so formed and deploys downwardly into the passenger compartment, whereby occupants are restrained so as not to be brought into a secondary collision with the inner side of the passenger compartment and an external object.

Then, when the folded air bag 21 is fixed to the brackets 37 of the roof 35 with the bolts 38 after the air bag 21 is covered by the air bag cover 34 and the inflator 33 is installed in place, in the event that the air bag 21 is erroneously fixed in a twisted state, there is caused a possibility that a smooth deployment of the air bag 21 is disrupted.

As shown in FIG. 7, since the folded air bag 21 contracts in the longitudinal direction when twisted, a distance between a pair of mounting portions 21a, 21a which are situated on sides of the twisted position of the air bag 21 decreases from D1 to D2. As this occurs, in the event that the belt-like protruding portion 34d is not formed on the air bag cover 34 which is twisted together with the air bag 21, since the air bag 21 becomes easier to be twisted, an amount ΔD by which the distance is decreased becomes smaller, and the aforesaid pair of mounting portions 21a, 21a can be fixed to the brackets 37, 37, respectively.

In this embodiment, however, since the belt-like protruding portion 34d is formed on the air bag cover 34 which is twisted together with the air bag 21, the air bag 21 becomes difficult to be twisted, and in the event that the air bag 21 is forced to be twisted, the amount ΔD by which the distance between the pair of mounting portions 21a, 21a which are situated on the sides of the twisted position is decreased becomes greater. As a result of this, the pair of mounting portions 21a, 21a which are situated on the sides of the twisted position do not reach the associated brackets 37, 37, respectively, whereby a case where the air bag 21 is fixed as it is twisted can be avoided assuredly.

Since the amount by which the longitudinal dimension of the air bag 21 is decreased when twisted becomes insufficient in the event that the width (height) of the belt-like protruding portion 34 is small, it is desirable to set the width of the belt-like protruding portion 34d equal to or greater than 10 mm in order to ensure that an erroneous assembly of the air bag 21 is prevented.

Figure 8A:
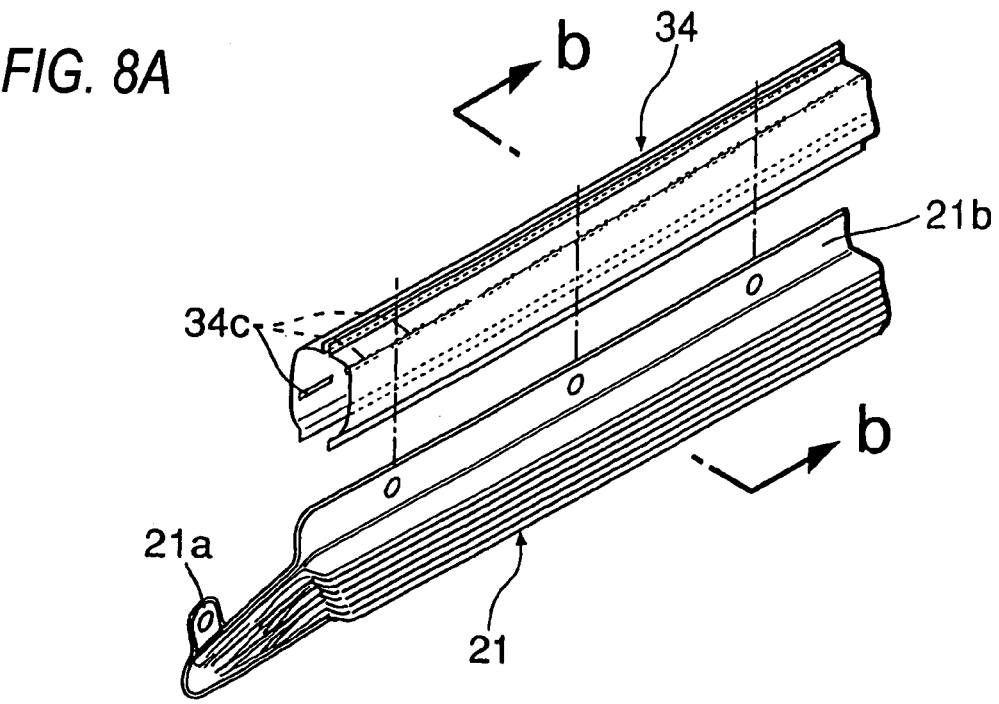
FIGS. 8A and 8B are drawings showing a second embodiment of the invention.
Figure 8B:
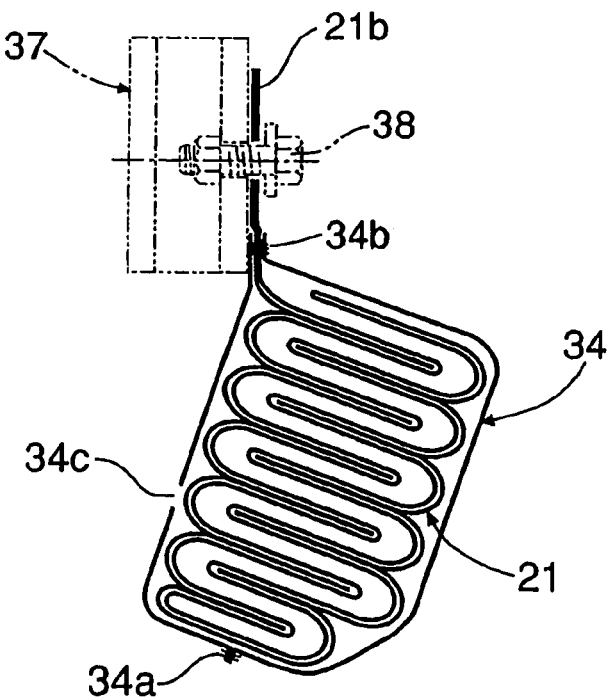

Next, a second embodiment of the invention will be described based on FIGS. 8A and 8B.

While, in the first embodiment that is described above, the belt-like protruding portion 34d is provided on the air bag cover 34 which covers the folded air bag 21, in a second embodiment, a belt-like protruding portion 21b is formed integrally along an upper edge of an air bag 21. This belt-like protruding portion 21b also functions as the plurality of mounting portions 21a provided on the air bag 21 described in the first embodiment.

Thus, a similar function and advantage to those attained by the first embodiment can also be attained by the second embodiment.

Figure 9A:
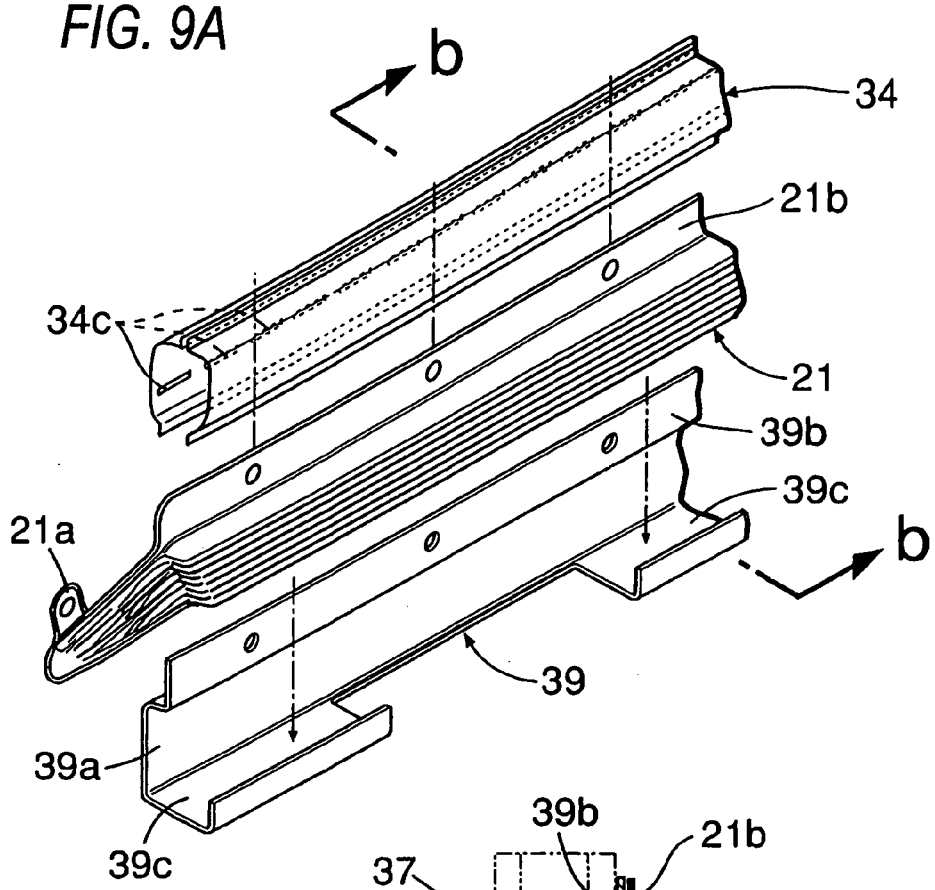
FIGS. 9A and 9B are drawings showing a third embodiment of the invention.
Figure 9B:
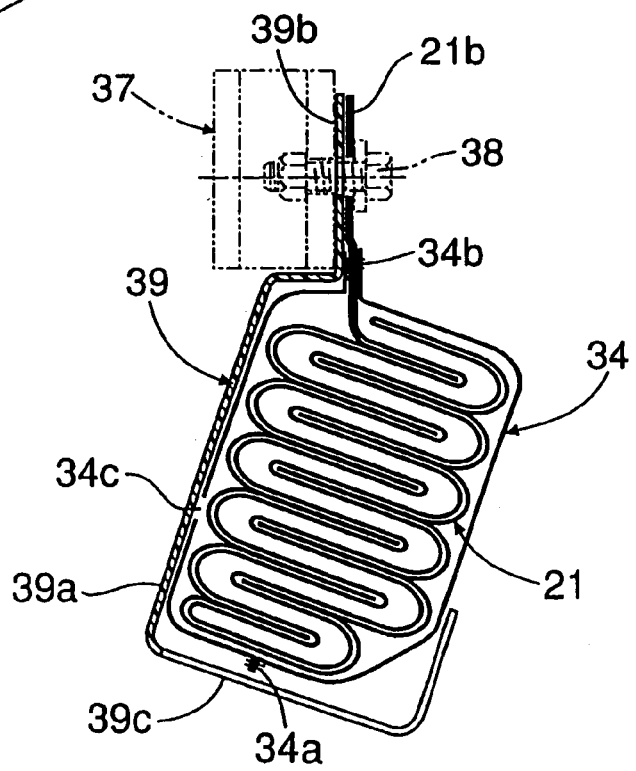

Next, a third embodiment of the invention will be described based on FIGS. 9A and 9B.

A third embodiment is such as to add a protector 39 to the second embodiment that is described above. The protector 39 is formed of an extremely thin synthetic resin in such a manner as to facilitate the deflection thereof and includes a main body portion 39a which extends longitudinally in a belt-like fashion along the folded air bag 21, a belt-like protruding portion 39b which extends along an upper edge of the main body portion 39*a*, and a plurality of protecting portions 39*c* which extend from a lower edge of the main body portion 39*a* at positions corresponding to the front pillar 11, the center pillar 12 or the rear pillar 15 in such a manner as to hold a bottom side of the air bag 21. When the belt-like protruding portion 21*b* on the air bag 21 is fixed to the brackets 37 with the bolts 38, the belt-like protruding portion 39*b* on the protector 39 is superimposed on the belt-like protruding portion 21*b* on the air bag 21 so as to be fastened together therewith.

When the air bag 21 breaks the air bag cover 34 and deploys downwardly, the protecting portions 39*c* of the protector 39 extend along the front pillar 11, the center pillar 12 or the rear pillar 15, whereby the air bag 21 is prevented from being caught by the front pillar 11, the center pillar 12 or the rear pillar 15 so as to enable the smooth deployment of the air bag 21.

Then, in the third embodiment, when the folded air bag 21 is twisted, the belt-like protruding portion 39*b* on the protector 39 and the belt-like protruding portion 21*b* on the air bag 21 are twisted simultaneously, whereby an amount by which the longitudinal dimension of the air bag 21 is decreased is increased sufficiently, thereby making it possible to prevent the occurrence of an erroneous assembly of the air bag 21 more assuredly.

Note that in the third embodiment, the belt-like protruding portion 21*b* of the air bag 21 can be removed, and in addition, the protector 39 of the third embodiment can be combined with the first embodiment.

Figure 10A:
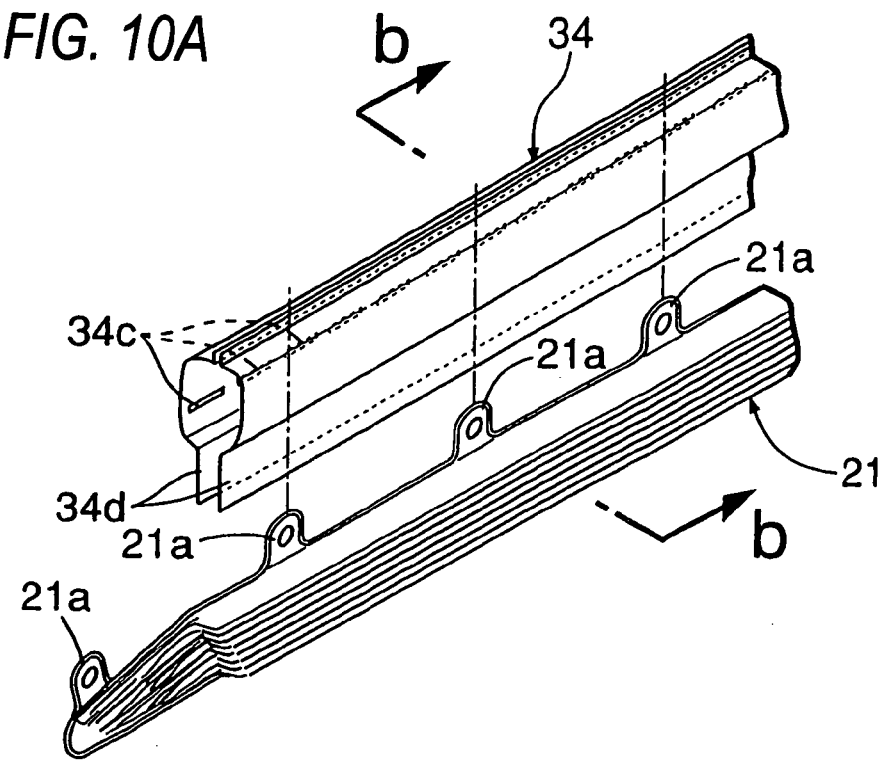
FIGS. 10A and 10B are drawings showing a fourth embodiment of the invention.
Figure 10B:
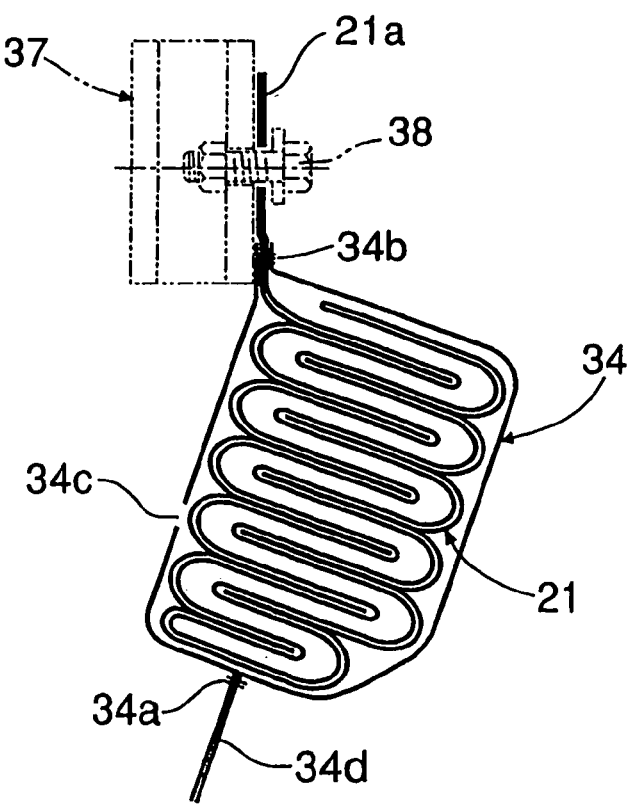

Next, a fourth embodiment of the invention will be described based on FIGS. 10A and 10B.

A fourth embodiment is a modification to the first embodiment, and while, in the first embodiment, the belt-like protruding portion 34*d* is formed along the upper edge of the air bag cover 34, in the fourth embodiment, a belt-like protruding portion 34*d* is formed along a lower edge of the air bag cover 34.

A function and advantage attained by the fourth embodiment are similar to those attained by the first embodiment.

Figure 11:
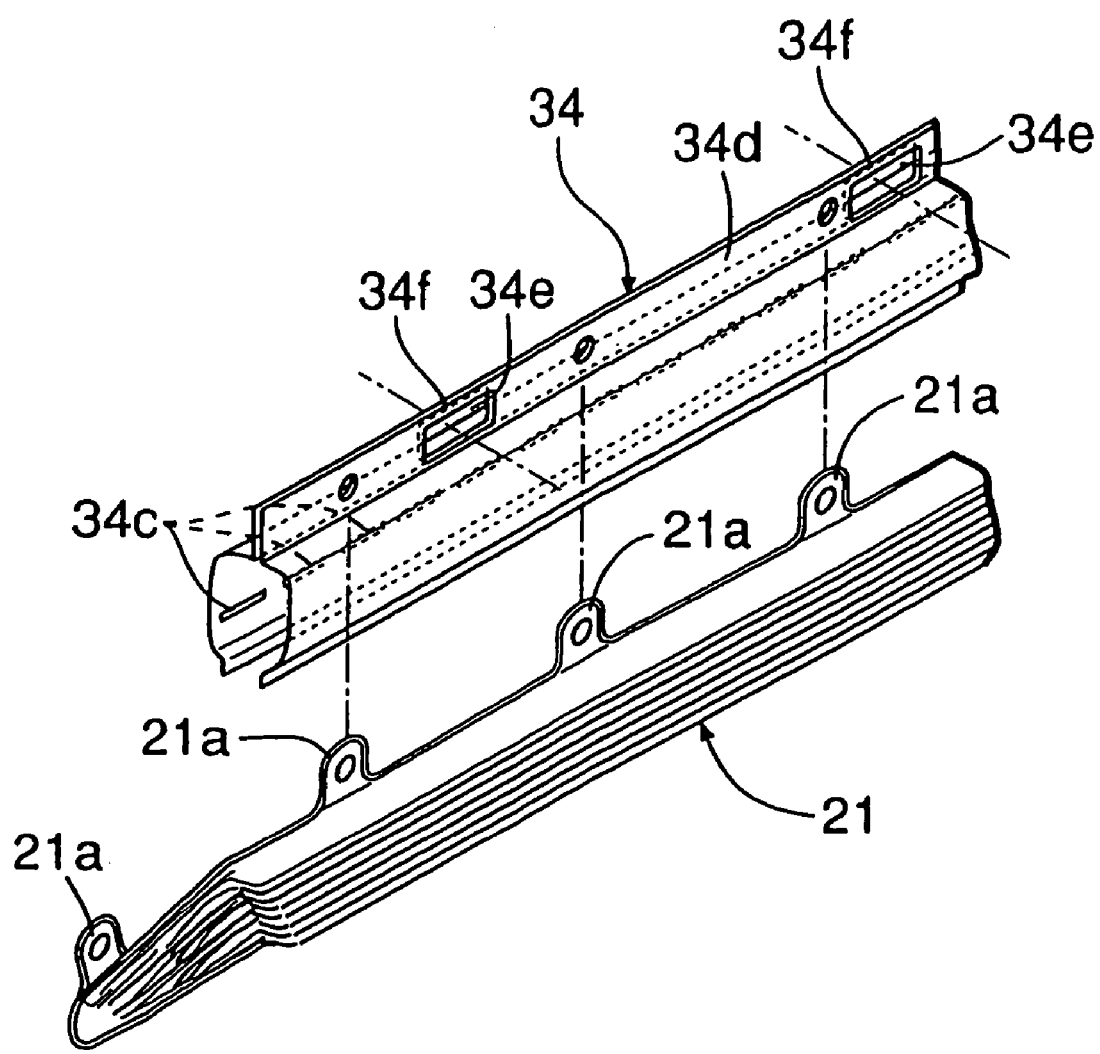
FIG. 11 is a drawing showing a fifth embodiment of the invention.

Next, a fifth aspect of the invention will be described based on FIG. 11.

A fifth embodiment is a modification to the first embodiment and is such that openings 34*e* are formed in the belt-like protruding portion 34*d* provided along the upper edge of the air bag cover 34 of the first embodiment. These openings 34*e* are provided to avoid an interference between, for example, a member such as an assist grip and the belt-like protruding portion 34*d* of the air bag cover 34 in the event that the assist grip is fixed to the roof 35. What is important here is that the opening 34*e* is not a notch. In case a notch is formed in the belt-like protruding portion 34*d* in such a manner as to open the upper edge thereof, the air bag 21 becomes easy to be twisted despite the provision of the belt-like protruding portion 34*d* and the advantage of preventing the erroneous assembly cannot be exhibited. In contrast, in case the openings 34*e* are such that the upper edge is connected by bridge portions 34*f*, the resisting force against the twist of the air bag 21 can be increased to thereby secure the advantage of preventing the erroneous assembly.

Figure 12A:
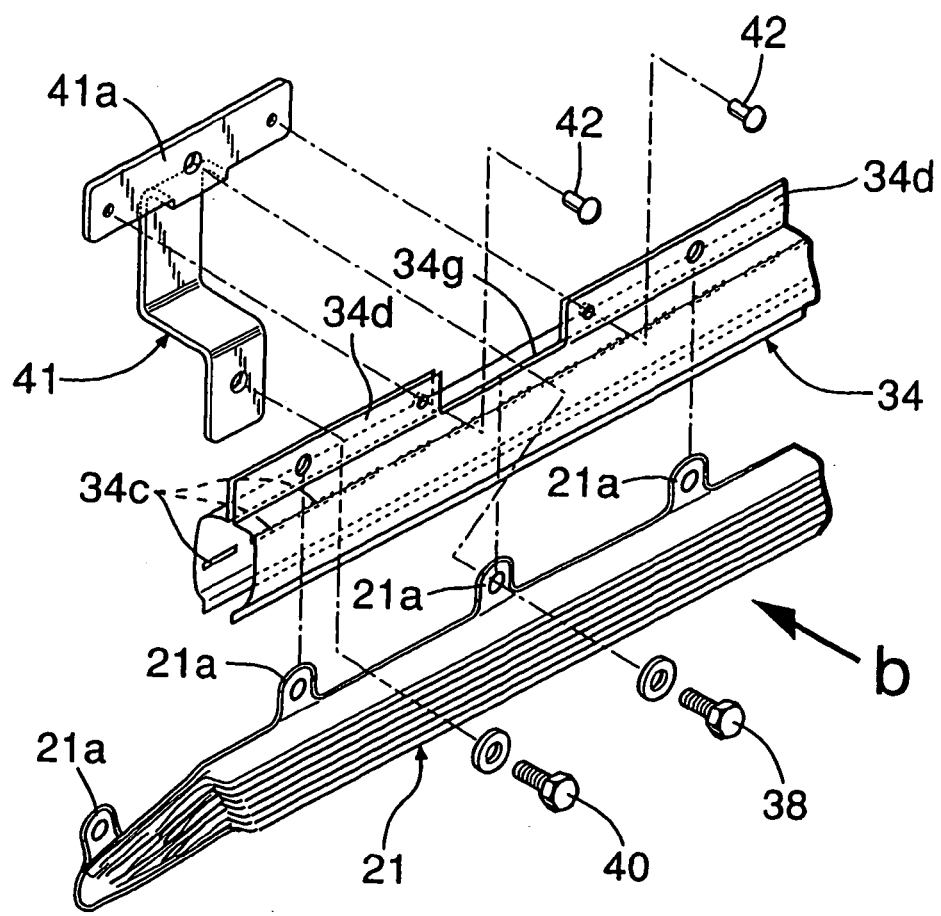
FIGS. 12A and 12B are drawings showing a sixth embodiment of the invention.
Figure 12B:
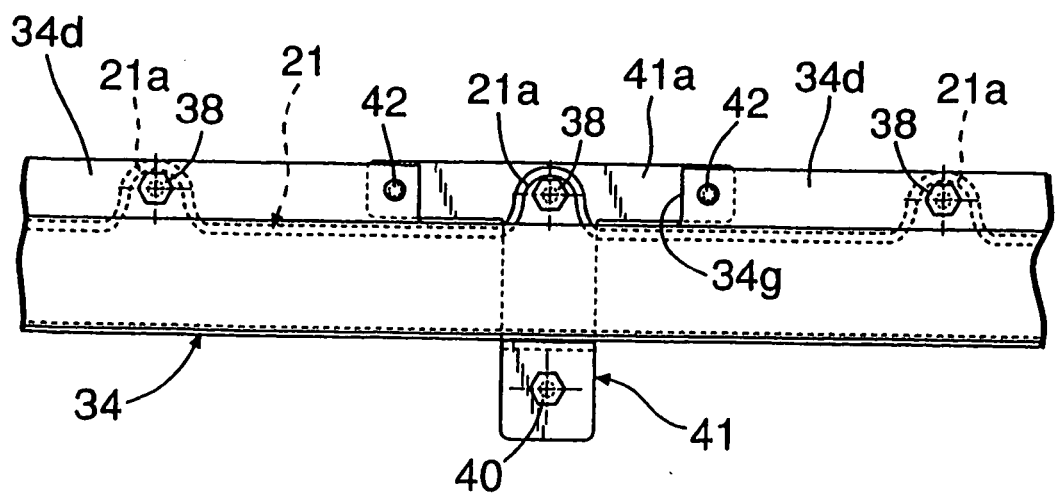

Next, a sixth embodiment of the invention will be described based on FIGS. 12A and 12B.

A sixth embodiment is a countermeasure against a case where the belt-like protruding portion 34*d* of the air bag cover 34 is broken by a breaking portion 34*g*. A bracket 41 which is fixed to the vehicle body with a bolt 40 includes a fixing portion 41*a* to which a predetermined mounting portion 21*a* of the air bag 21 is fixed with a bolt 38, and both ends of the fixing portion 41*a* are extended in the longitudinal directions of the air bag 21 so as to be coupled with two rivets 42, 42 to the belt-like protruding portion 34*d* at positions situated at both ends of the breaking portion 34*g*.

Thus, even if the air bag 21 becomes easy to be twisted due to the provision of the breaking portion 34*g*, the air bag 21 can be made difficult to be twisted by bridging the breaking portion 34*g* by the fixing portion 41*a* of the bracket 41, whereby the occurrence of an erroneous assembly can be prevented assuredly.

Figure 13A:
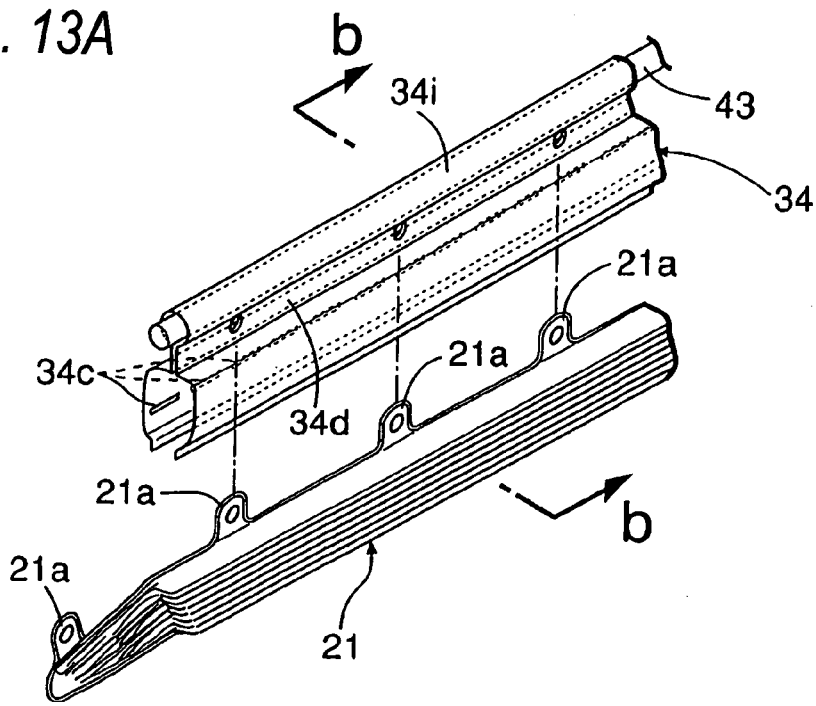
FIGS. 13A to 13C are drawings showing a seventh embodiment of the invention.

Next, a seventh embodiment of the invention will be described based on FIGS. 13A to 13C.

A seventh embodiment is such that an air bag cover 34 is formed by bending a single nonwoven fabric, and a twist preventing member 43 made up of a round rod formed of a synthetic resin is inserted into a tubular portion 34*i* formed by a sewing portion 34*h* extending along an upper edge of the air bag cover 34. Similarly to the first embodiment, the fixing of the air bag 21 is implemented by fastening together a belt-like protruding portion 34*d* of the air bag cover 34 and the mounting portions 21*a* of the air bag 21 with the bolts 38.

Figure 13C:
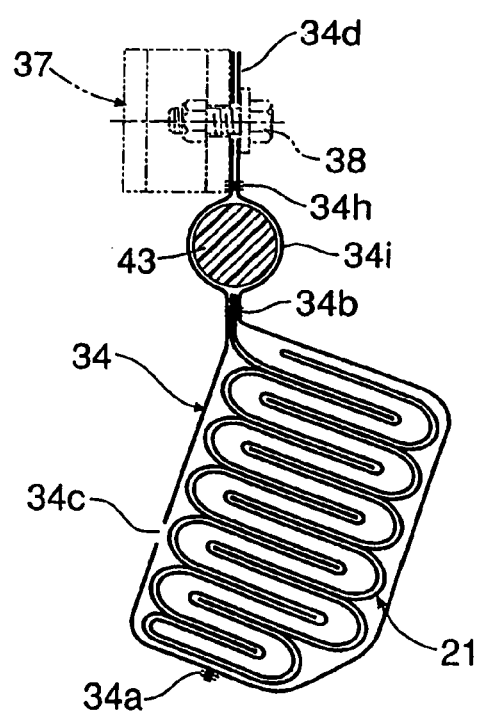
Figure 13B:
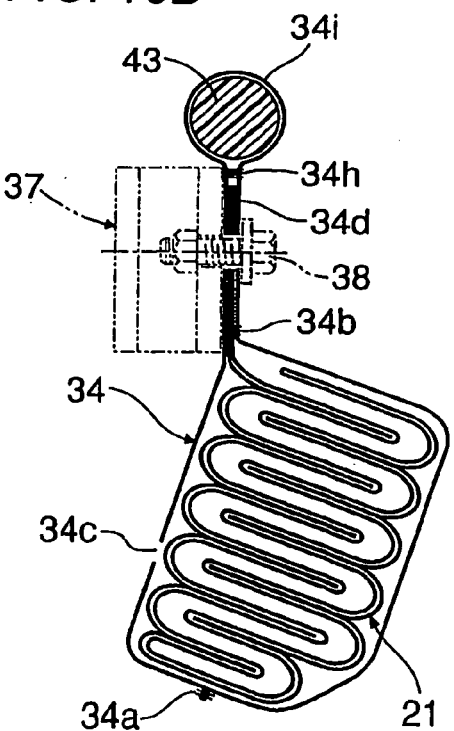

Note that as shown in FIG. 13C, the twist preventing member 43 can be provided below the belt-like protruding portion 34*d* instead of being provided above the belt-like protruding portion 34*d*.

According to the seventh embodiment, even if the folded air bag 21 is attempted to be twisted, the folded air bag 21 cannot be twisted due to the twist preventing member 43 resisting the attempt to twist the folded air bag 21, and consequently, the erroneous assembly of the air bag 21 can be prevented assuredly.

Figure 14:
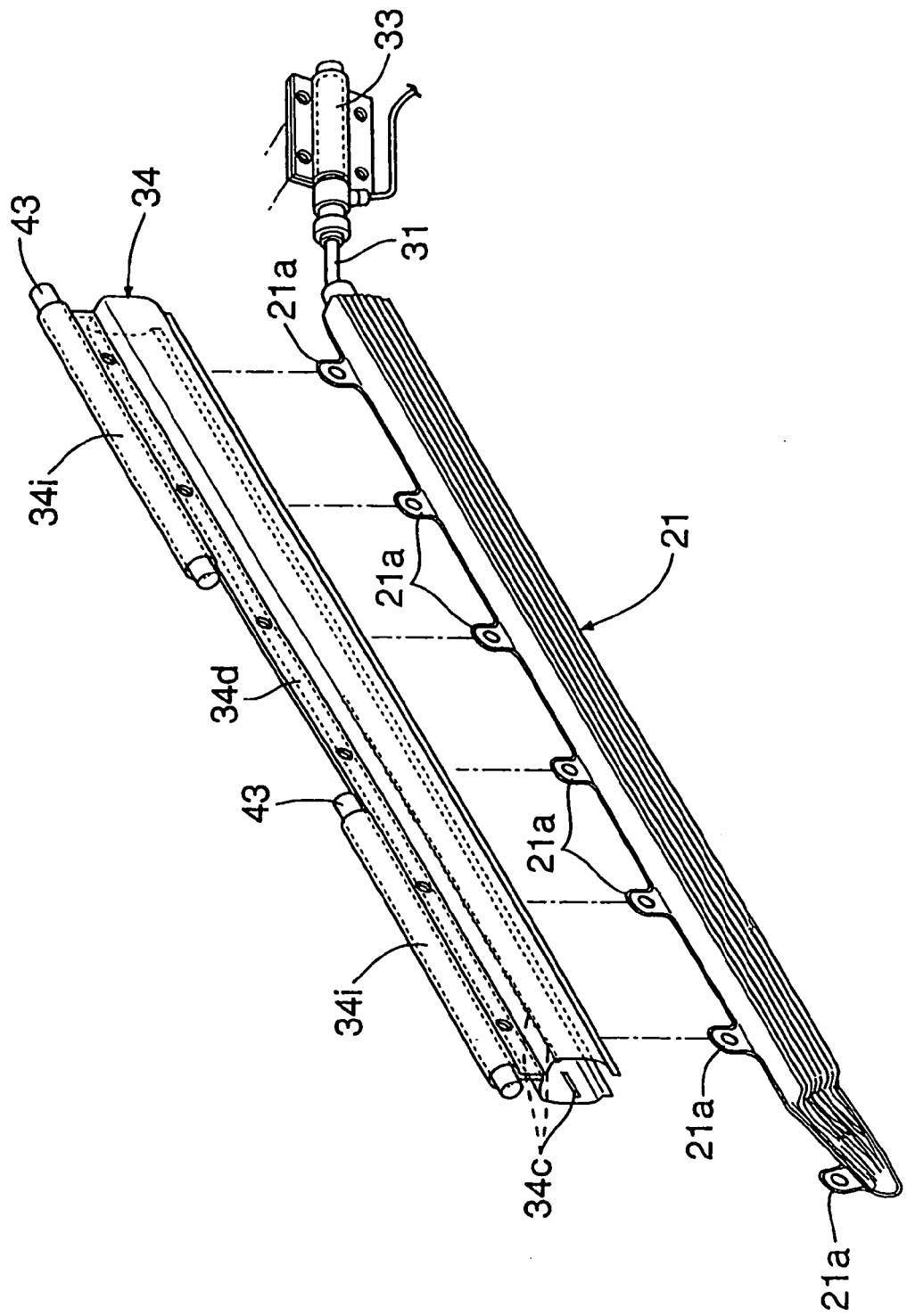
FIG. 14 is a drawing showing an eighth embodiment of the invention.

Next, an eighth embodiment of the invention will be described based on FIG. 14.

While, in the seventh embodiment that is described above, the twist preventing member 43 is disposed so as to extend along the full length of the air bag 21, in an eighth embodiment, two divided twist preventing members 43, 43 are disposed at front and rear portions of the air bag 21. According to the construction, a job of fixing the folded air bag 21 in such a manner as to follow the curved upper edges of the door openings 14, 17 can be facilitated.

With the eighth embodiment, while there exists a possibility that the air bag 21 is twisted at a position between the two divided twist preventing members 43, 43, since a portion where a twist is anticipated to occur is limited, even if there occurs a twist, the twist so occurring can easily be found.

Next, a ninth embodiment of the invention will be described based on FIGS. 15A and 15B.

Figure 15A:
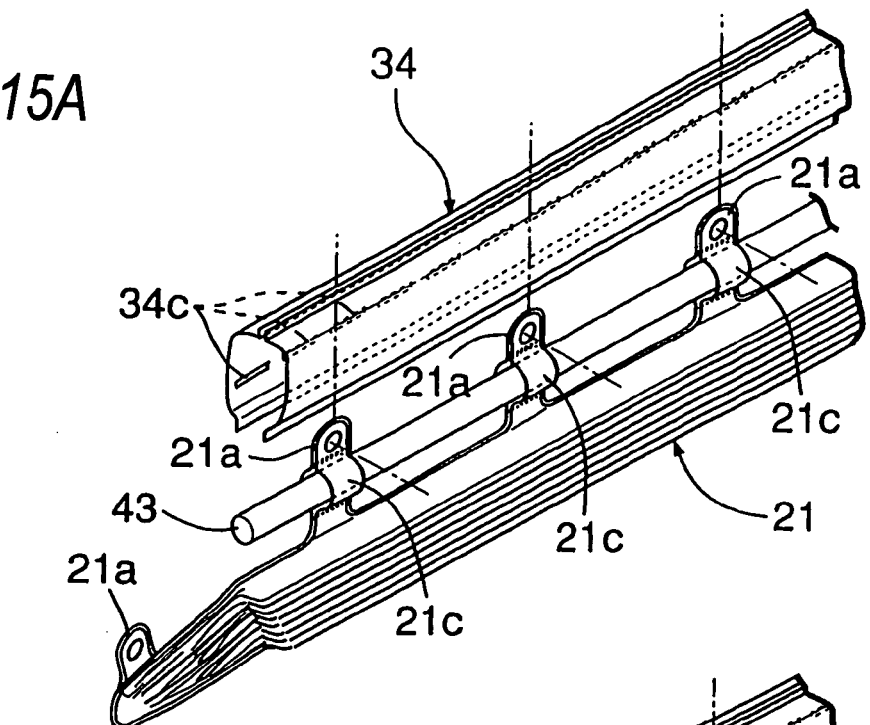
FIGS. 15A and 15B are drawings showing a ninth embodiment of the invention.
Figure 15B:
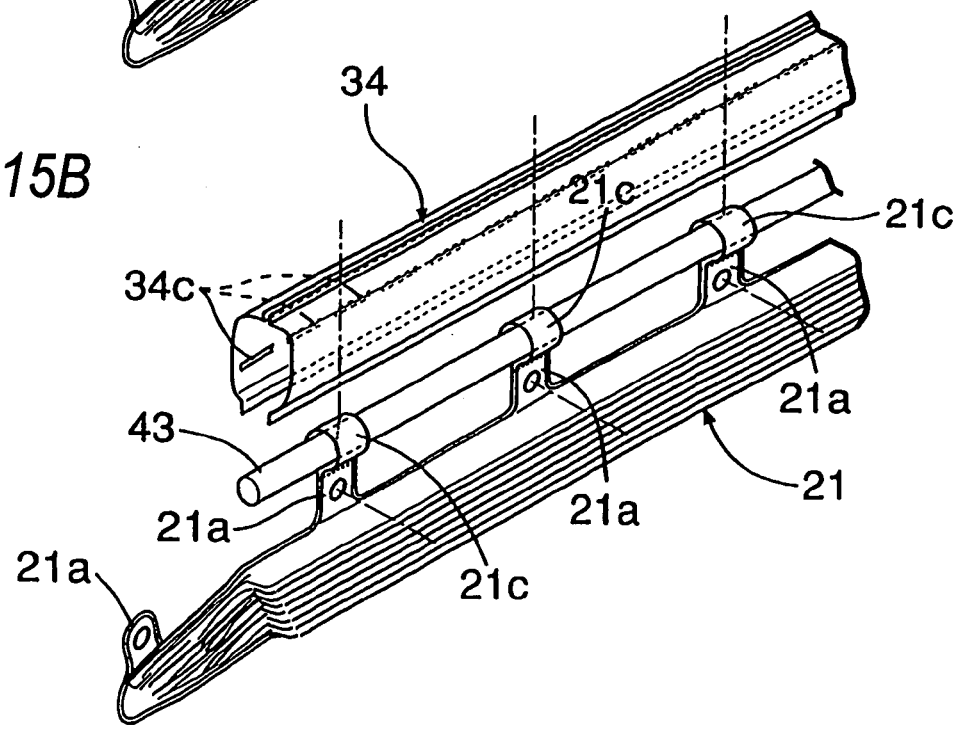

While, in the seventh and eighth embodiments, the tubular portion 34*i* for supporting the twist preventing member 43 is provided on the air bag cover 34, a ninth embodiment shown in FIG. 15A is such that tubular portions 21*c* are formed on lower sides of the mounting portions 21*a* of the airbag so that the twist preventing member 43 can be passed therethrough. In addition, as shown in FIG. 15B, the tubular portions 21*c* may be formed on upper sides of the mounting portions 21*a* of the air bag so that the twist preventing member 43 can be passed therethrough.

A similar function and advantage to those attained by the seventh and eighth embodiments can also be attained by the ninth embodiment.

Next, a tenth embodiment of the invention will be described based on FIGS. 16A to 16E.

Figure 16A:
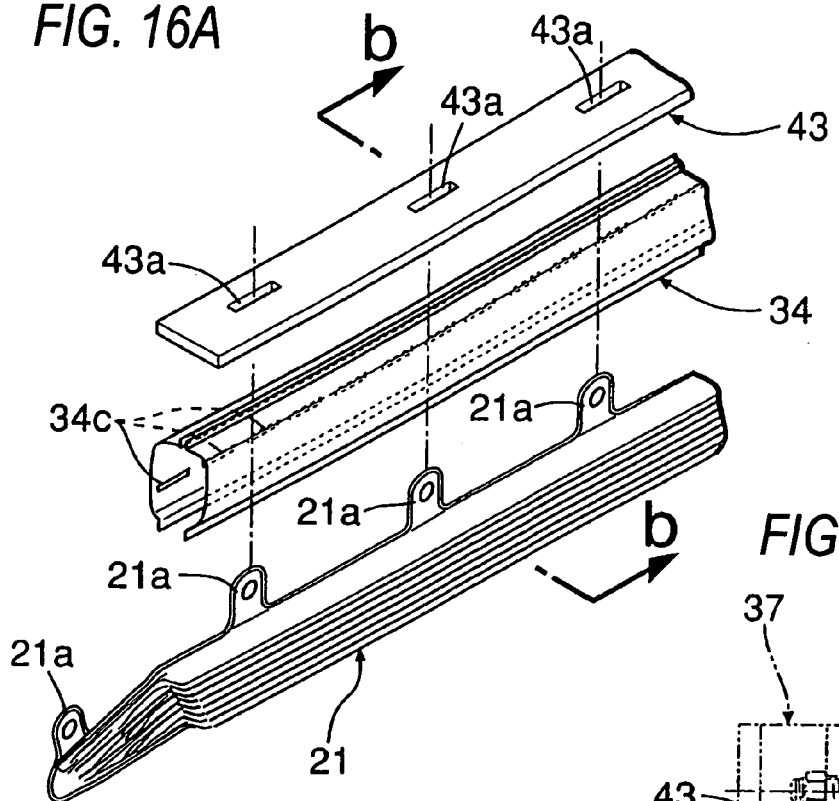
FIGS. 16A to 16E are drawings showing a tenth embodiment of the invention.
Figure 16B:
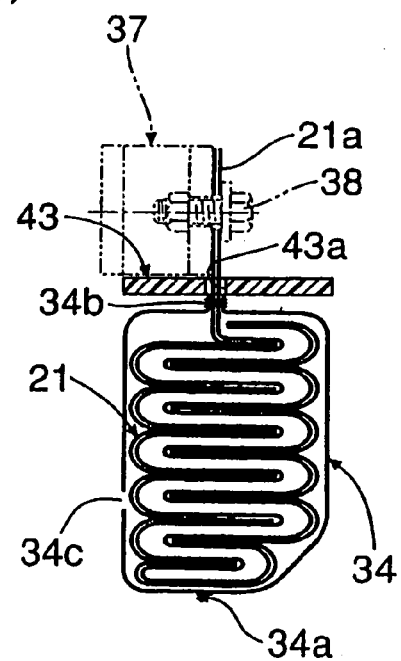

While, in the seventh to ninth embodiments, the twist preventing member 43 having a circular cross section is used, a twist preventing member 43 used in a tenth embodiment shown in FIGS. 16A, 16B is formed into an elongated plate-like shape, and openings 43a are formed in predetermined positions thereof so that the mounting portions 21a of the air bag 21 are passed therethrough from below to above.

Figures 16D, 16E:
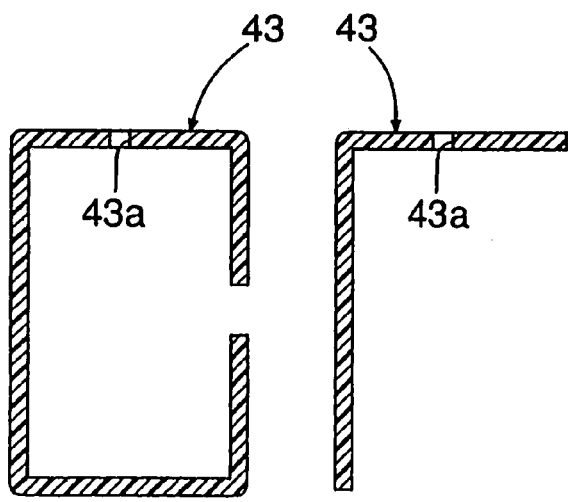
Figure 16C:
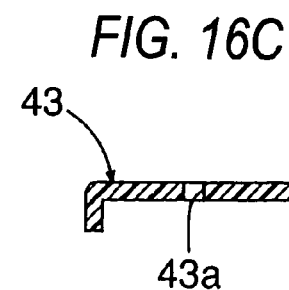

Note that the cross-sectional shape of the twist preventing member 43 can be changed appropriately, and as shown in FIG. 16C, there may be provided a twist preventing member having downwardly bent flanges provided along side edges thereof, as shown in FIG. 16D, there may be provided a twist preventing member having an L-shaped cross section, or as shown in FIG. 16E, there may be provided a twist preventing member having a C-shaped cross section. The twist preventing member having a C-shaped cross section needs to be deformed or broken easily by a pressure applied by the air bag 21 which is being deployed so as to allow for the deployment of the air bag.

According to the tenth embodiment, even if the folded air bag 21 is attempted to be twisted, the air bag 21 cannot be twisted due to the twist preventing member 43 resisting the attempt to twist the air bag 21, and consequently, the erroneous assembly of the air bag 21 is prevented assuredly.

Next, an eleventh embodiment of the invention will be described based on FIGS. 17A to 17C.

Figure 17A:
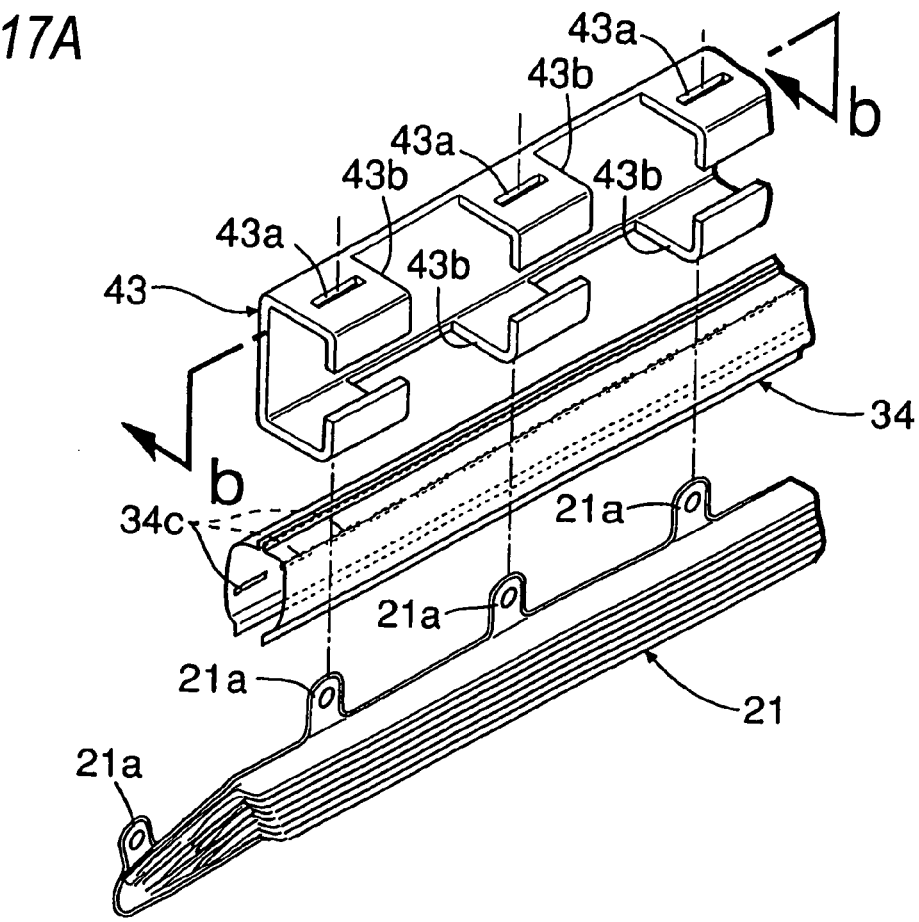
FIGS. 17A to 17C are drawings showing an eleventh embodiment of the invention.
Figure 17B:
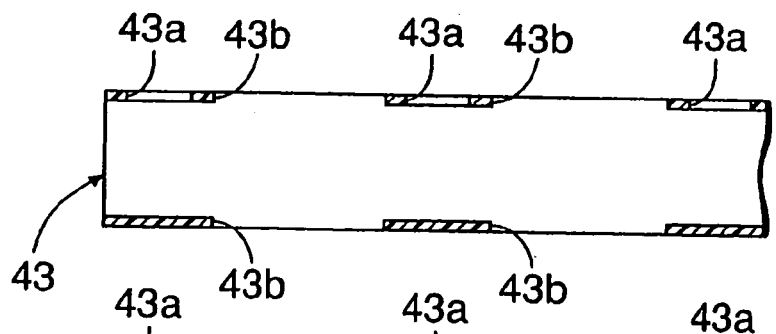
Figure 17C:
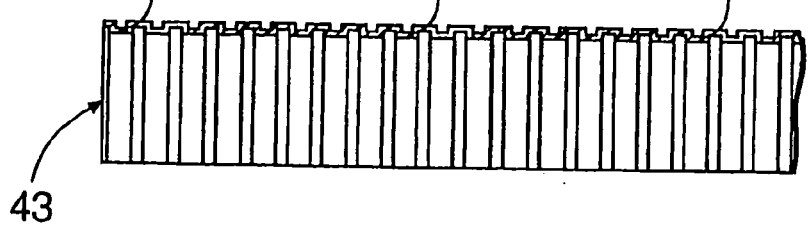

As shown in FIGS. 17A, 17B, a twist preventing member 43 according to an eleventh embodiment is similar to the twist preventing member 43 having a C-shaped cross section of the tenth embodiment which is shown in FIG. 16E, but since the twist preventing member 43 of the eleventh embodiment has cut-outs 43b provided at predetermined intervals, the twist preventing member 43 can easily be deflected to be deformed, this facilitating the job of fixing the air bag in such a manner as to follow along the curved upper edges of the door openings 14, 17. In addition, while a twist preventing member 43 according to the eleventh embodiment which is shown in FIG. 17C is similar to the twist preventing member 43 having an L-shaped cross section according to the tenth embodiment which is shown in FIG. 16D, the twist preventing member 43 is formed in a wave-like fashion as a whole, and hence the twist preventing member 43 can easily be deflected to be deformed, which facilitates the job of fixing the air bag in such a manner as to follow along the curved upper edges of the door openings 14, 17.

Figure 18A:
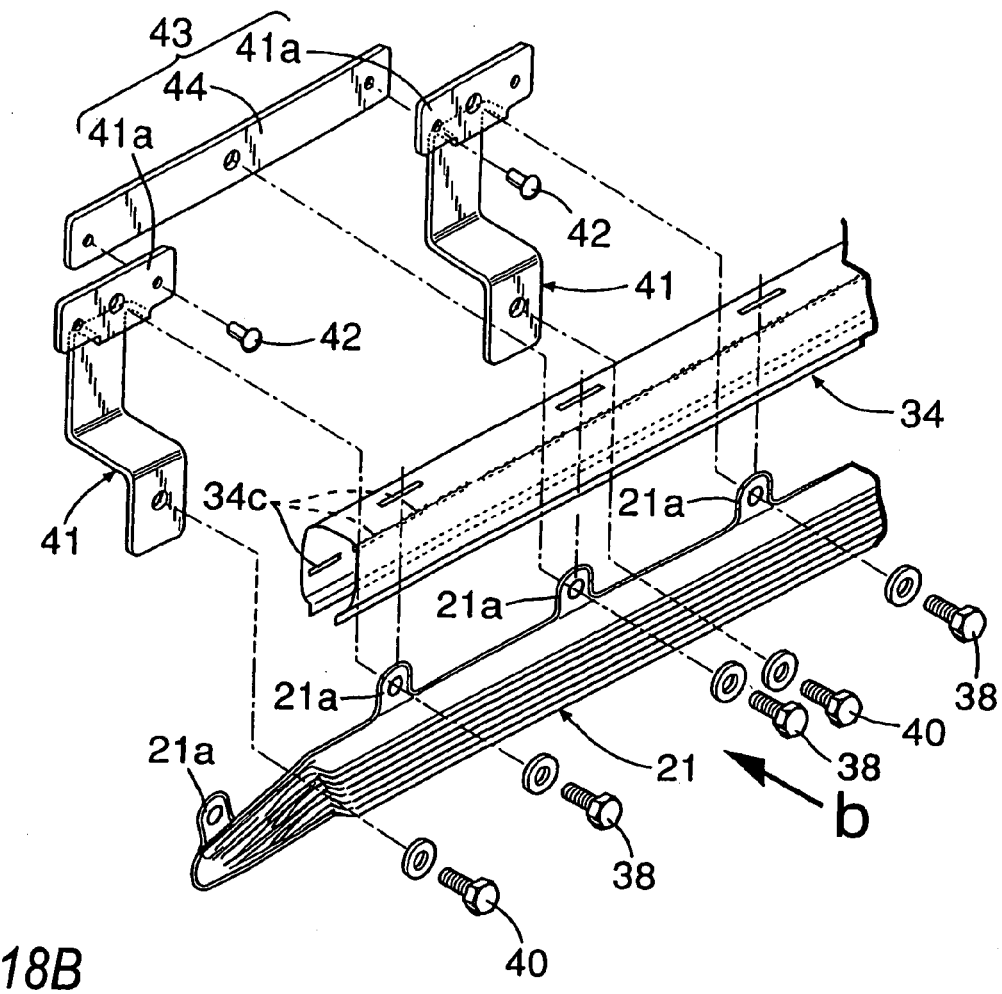
FIGS. 18A and 18B are drawings showing a twelfth embodiment of the invention.
Figure 18B:
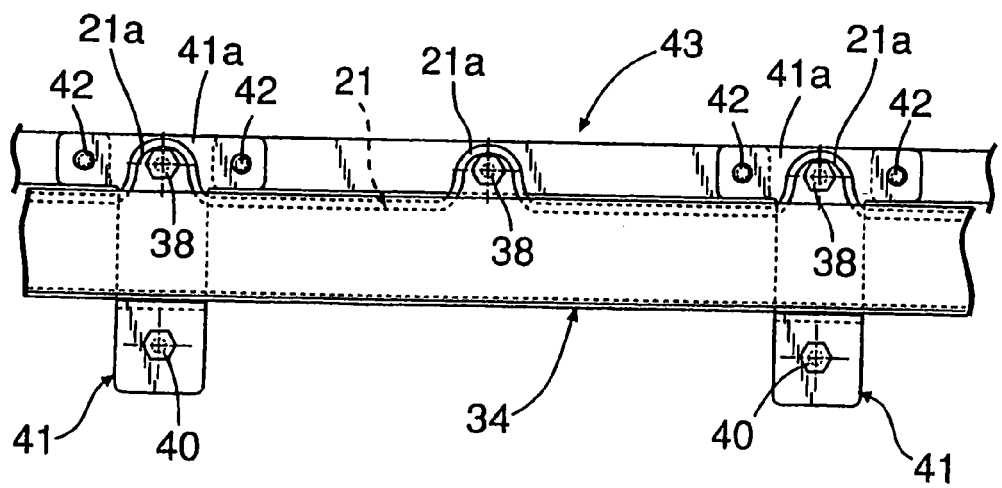

Next, a twelfth embodiment of the invention will be described based on FIGS. 18A and 18B.

A plurality of brackets 41 fixed to the vehicle body with bolts 40 have fixing portions 41a to which predetermined mounting portions 21a of the air bag 21 are fixed with bolts 38, and the adjacent fixing portions 41a are coupled to ends of plate-like coupling members 44 with rivets 42. Consequently, the fixing portions 41a of the brackets 41 which are coupled alternately and the coupling members 44 make up a rod-like twist preventing member 43 as a whole, whereby the twist of the folded air bag 21 can be prevented.

Thus, while the embodiments of the invention are described in detail, the invention can be changed variously with respect to design without departing from the spirit and scope of the invention.

As is described above, according to the first aspect of the invention, since the belt-like protruding portions which extend longitudinally along the folded air bag are provided on the external portion of the air bag, the longitudinal dimension of the air bag is largely contracted when the air bag is twisted and hence, the interval between the adjacent mounting portions is decreased, thereby making it impossible for the air bag to be fixed. As a result, the air bag is assuredly prevented from being mounted in the twisted state, whereby the air bag is allowed to be deployed smoothly.

According to the second aspect of the invention, since the rod-like twist preventing member is fixed longitudinally along the folded air bag, the air bag is disabled from being twisted. As a result, the air bag is assuredly prevented from being fixed in the twisted state, whereby the air bag is allowed to be deployed smoothly.

What is claimed is:

1. An occupant restraint system, comprising:
   an air bag having a folded state and an unfolded state, said air bag having mounting portions provided longitudinally at a plurality of locations, said mounting portions being fixable to a side portion of a roof;
   an air bag cover covering the air bag in the folded state;
   a belt formed from a first extending portion extending from said air bag and a second extending portion extending from said air bag cover, said first and second extending portions being fastened together with a sewing so as to form said belt with said first and second extending portions extending away from said sewing; and
   an inflator for generating gas during a collision of a vehicle to expand said air bag to the unfolded state;
   wherein said air bag is inflatable to be deployed as a curtain along an inner side of a passenger compartment by gas generated from the inflator, and
   wherein a twisting of the air bag in the folded state is prevented by said belt which extends longitudinally along an external portion of said air bag.

2. The occupant restraint system as set forth in claim 1, wherein
   the width of the belt is equal to or greater than 10 mm.

3. The occupant restraint system according to claim 1, wherein
   the belt is provided with openings such that an upper edge above the openings is connected by bridge portions.

4. The occupant restraint system according to claim 1, wherein
   the belt is broken by a breaking portion, and
   a bracket provided on the vehicle couples with the belt on both opposite edges of the breaking portion.

5. The occupant restraint system according to claims 1, wherein brackets are provided on the vehicle,
   the mounting portions are directly fixed between both sides of the belt, and
   the belt with the mounting portions are fastened to the brackets.

* * * * *